United States Patent
Stratton et al.

(10) Patent No.: US 9,530,086 B1
(45) Date of Patent: Dec. 27, 2016

(54) SCANNED SOFTWARE ACTIVATION CODES IN AGRICULTURAL AND CONTRUCTION WORK EQUIPMENT SYSTEMS

(71) Applicant: CNH Industrial America LLC, New Holland, PA (US)

(72) Inventors: John Stratton, Denver, CO (US); Andrew Meyer, Prospect Heights, IL (US); Frank Rabusic, Mt. Pleasant, WI (US); Andrew C. Olliver, Turin (IT)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/923,569

(22) Filed: Oct. 27, 2015

(51) Int. Cl.
*G06K 19/06* (2006.01)
*G06K 7/14* (2006.01)

(52) U.S. Cl.
CPC ....... *G06K 19/06037* (2013.01); *G06K 7/1443* (2013.01)

(58) Field of Classification Search
CPC ............ G06K 19/06; G06K 7/14; G06K 7/10; G06K 19/00; G06K 9/18; G06K 9/36; G06K 9/80; G06F 17/00
USPC ........ 235/494, 454, 375, 487, 462.09, 462.1
See application file for complete search history.

(56) References Cited

U.S. PATENT DOCUMENTS

| | | | |
|---|---|---|---|
| 6,421,590 B2 | 7/2002 | Thibault | |
| 6,522,251 B1 | 2/2003 | Menne et al. | |
| 7,042,333 B2 | 5/2006 | Dix et al. | |
| 7,292,937 B2 | 11/2007 | Kuroda et al. | |
| 7,672,666 B2 | 3/2010 | Hasan et al. | |
| 7,692,531 B2 | 4/2010 | Matsubara et al. | |
| 7,719,422 B1 | 5/2010 | Steinmetz et al. | |
| 7,812,712 B2 | 10/2010 | White et al. | |
| 8,285,611 B2 | 10/2012 | Fuller et al. | |
| 8,362,876 B2 | 1/2013 | Merten | |
| 8,515,603 B2 | 8/2013 | Shinogi et al. | |
| 8,538,601 B2 | 9/2013 | MacMillan | |
| 8,659,387 B2 | 2/2014 | Nitta et al. | |
| 8,706,349 B2 | 4/2014 | Rector et al. | |
| 8,768,565 B2 | 7/2014 | Jefferies et al. | |
| 8,847,936 B2 | 9/2014 | Chervenka et al. | |
| 8,884,738 B2 | 11/2014 | Spangenberg et al. | |
| 8,948,975 B2 | 2/2015 | Peterson et al. | |
| 8,958,927 B2 | 2/2015 | Tsuchida et al. | |
| 2004/0015477 A1* | 1/2004 | Beck | A01B 79/005 |
| 2004/0051380 A1 | 3/2004 | Okada | |
| 2010/0205450 A1* | 8/2010 | Sarnacke | G07C 5/0808 713/185 |
| 2011/0087401 A1 | 4/2011 | Tsao | |
| 2012/0028624 A1* | 2/2012 | Jedlicka | H04M 3/38 455/418 |
| 2013/0024330 A1 | 1/2013 | Christie et al. | |
| 2013/0179005 A1 | 7/2013 | Nishimoto et al. | |
| 2013/0204466 A1 | 8/2013 | Ricci | |
| 2013/0211623 A1 | 8/2013 | Thompson et al. | |

(Continued)

*Primary Examiner* — Edwyn Labaze
(74) *Attorney, Agent, or Firm* — Rebecca L. Henkel

(57) ABSTRACT

A work equipment system includes a control module coupled to a display to present a virtual control on the display upon receipt of an activation code. The activation code is provided in an activation tag on an activation display. An activation tag reader is coupled wired or wirelessly to the control module and is configured for reading the activation tag and sending a signal representative of the activation code to the control module.

20 Claims, 6 Drawing Sheets

(56) References Cited

U.S. PATENT DOCUMENTS

| | | |
|---|---|---|
| 2014/0025785 A1 | 1/2014 | Zahnow |
| 2014/0195126 A1 | 7/2014 | Prickel et al. |
| 2014/0263607 A1* | 9/2014 | Mindeman .............. G06F 17/30 235/375 |
| 2014/0303837 A1 | 10/2014 | Tuukkanen |
| 2015/0067567 A1 | 3/2015 | Langsdorf |

* cited by examiner

SCANNED SOFTWARE ACTIVATION CODES IN AGRICULTURAL AND CONTRUCTION WORK EQUIPMENT SYSTEMS

BACKGROUND OF THE INVENTION

1. Field of the Invention

The present invention relates generally to work equipment such as agricultural and construction vehicles and implements, more specifically to the in-cab display software installed in such work vehicles, and still more specifically to the procedures for enabling or activating various functionalities of the display software installed in the work equipment.

2. Description of the Related Art

Work equipment, such as, for example, both agricultural and construction vehicles and implements, including self-propelled implements, have become increasingly more sophisticated and complex. Computer controlled functionalities provide more detailed, accurate and advantageous operation of the work equipment in multiple situations under a variety of conditions and requirements. Work equipment can be required to perform a variety of different functions at different times. For example, a tractor or other towing vehicle may be used for tilling, planting, spraying, fertilizing and harvesting. When performing these different functions, different agricultural implements are towed behind the tractor. Self-propelled harvesting equipment can be used for harvesting a variety of different crops. Construction equipment also can be used for different purposes under different operating conditions. In modern work equipment, an operator's cab is a control room for computerized systems to control and monitor not only the operation and performance of a towing vehicle but also of any implement(s) towed behind the towing vehicles, as well as to monitor ambient conditions at the work site. An in-cab display with touch-screen capabilities serves as the operator's access point for controlling and monitoring many of the functions.

It is known to provide sophisticated software packages having multiple features and uses, not all of which may be desired by a particular owner or operator of the work equipment at the time of purchase. Accordingly, a particular owner or operator might pay for some but not all functionalities available in the installed system as provided from the manufacturer, and only the desired functionalities will be enabled on the equipment as delivered. However, due to changes in use of the work equipment, at a later time an owner might have need to use other features that had been non-activated previously. Add-on software for yet further functions are available for later installation and activation. Both supplied and add-on software receive updates, improvements or upgrades and replacements, which again may require some type of activation or activation before the software is enabled for use. In some situations, the right to use a feature or function on one system might be transferred to a different system, requiring transfer of previous activation.

Just as with software commonly known to consumers, operators and owners of work equipment frequently have the need to activate software for desired functionalities, as well as for installing upgrades, replacements and add-ons for improved and additional functionalities desired while owning the equipment. Activations of the initially acquired functions, updates, improvements, replacements, add-ons, transfers and the like often require the entry of activation codes, which are randomly generated alphanumeric sequences that may be rather short or can be quite long. For example, it is common that an activation code includes a string of 16 numerals, uppercase letters and lowercase letters having no pattern or sequence. To activate a desired functionality, it is necessary to enter the activation code 100% accurately. In some situations it may be necessary to enter multiple codes or the same code more than once. Since the activation codes are randomly generated sequences of uppercase and lowercase letters and numerals, without pattern or reason, entering the code can be difficult under reasonable conditions, and even more difficult when it is necessary to enter a code or codes at a worksite or in a field. Commonly, the user input for the computer of work equipment consists of a touch screen, which can make the entry of activation codes even yet more difficult. An errant placed finger, omission of uppercase designation or other mistake results in an invalid activation code entry. When the activation code must be entered multiple times, an error in a subsequent entry can invalidate earlier entries, essentially requiring a start over of the activation process. As a result, the mere act of entering activation codes can be an event of significant frustration and delay. When the work vehicle is at a worksite, any such delay in activation delays operation of the equipment to perform the necessary work.

What is needed in the art is a more efficient procedure for entering activation codes in work equipment such as construction and agricultural vehicles and implements.

SUMMARY OF THE INVENTION

The present invention provides an activation code as a barcode or QR code on an activation tag. The activation tag is read by a reader to enable functions in work equipment The invention in one form is directed to a work equipment system having work equipment for controllably performing work; an optical machine readable activation tag containing data representing a software activation code; an optical reader configured for reading the activation tag and providing an output signal dependent on the activation code; and an electrical processing circuit coupled with the optical reader and the work equipment.

The invention in another form is directed to a work equipment system with a display configured to present a virtual control, a control module coupled to the display and configured to enable presentation of the virtual control only after receiving an activation code; an activation tag display having an activation tag thereon, the activation tag exhibiting the activation code; and an activation tag reader coupled to the control module and configured for reading the activation tag and sending a signal to the control module representative of the activation code.

The invention in another form is directed to a method for activating a control module in work equipment to enable a display to present a virtual control for operating the work equipment, with steps of obtaining an activation tag containing the activation code as one of a barcode and a QR code; providing an activation tag reader of a type for reading the activation tag and transmitting a signal representative of the activation code to the control module; and reading the activation tag, transmitting the signal and enabling the display to present the virtual control.

An advantage of the present invention is that it provides a quicker and easier way to enter activation codes in work equipment such as agricultural and construction work vehicles and implements.

A further advantage of the present invention is that an activation code can be entered without manual input.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
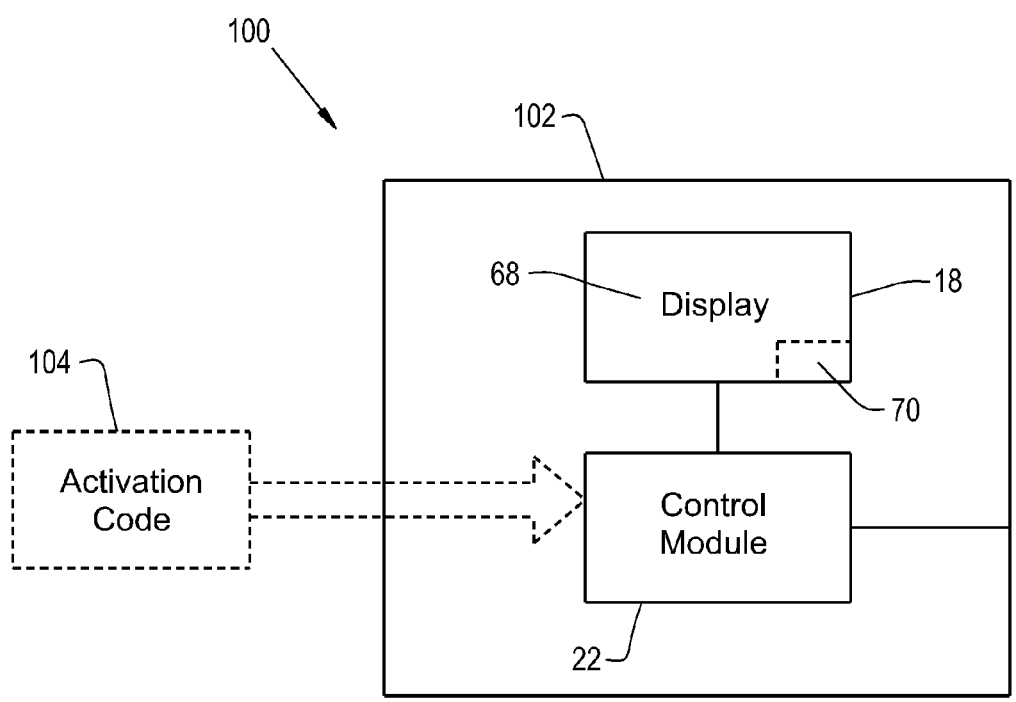
FIG. 1 is a schematic illustration of a work equipment system disclosed herein.

Referring now to the drawings, and more particularly to FIG. 1, there is shown an embodiment of a work equipment system 100 having work equipment 102 and a touch screen display 18 that is incorporated in work equipment 102. Display 18 is an interactive display 18 configured to provide information to a user and allow the user to direct the operation of work equipment 102. A control module 22 receives information from sensors on work equipment 102, stores and displays selected portions of that information and other stored information. Enabling the displaying of at least some of the information and control features on display 18 is dependent on providing an activation code 1 to control module 22.

Figure 2:
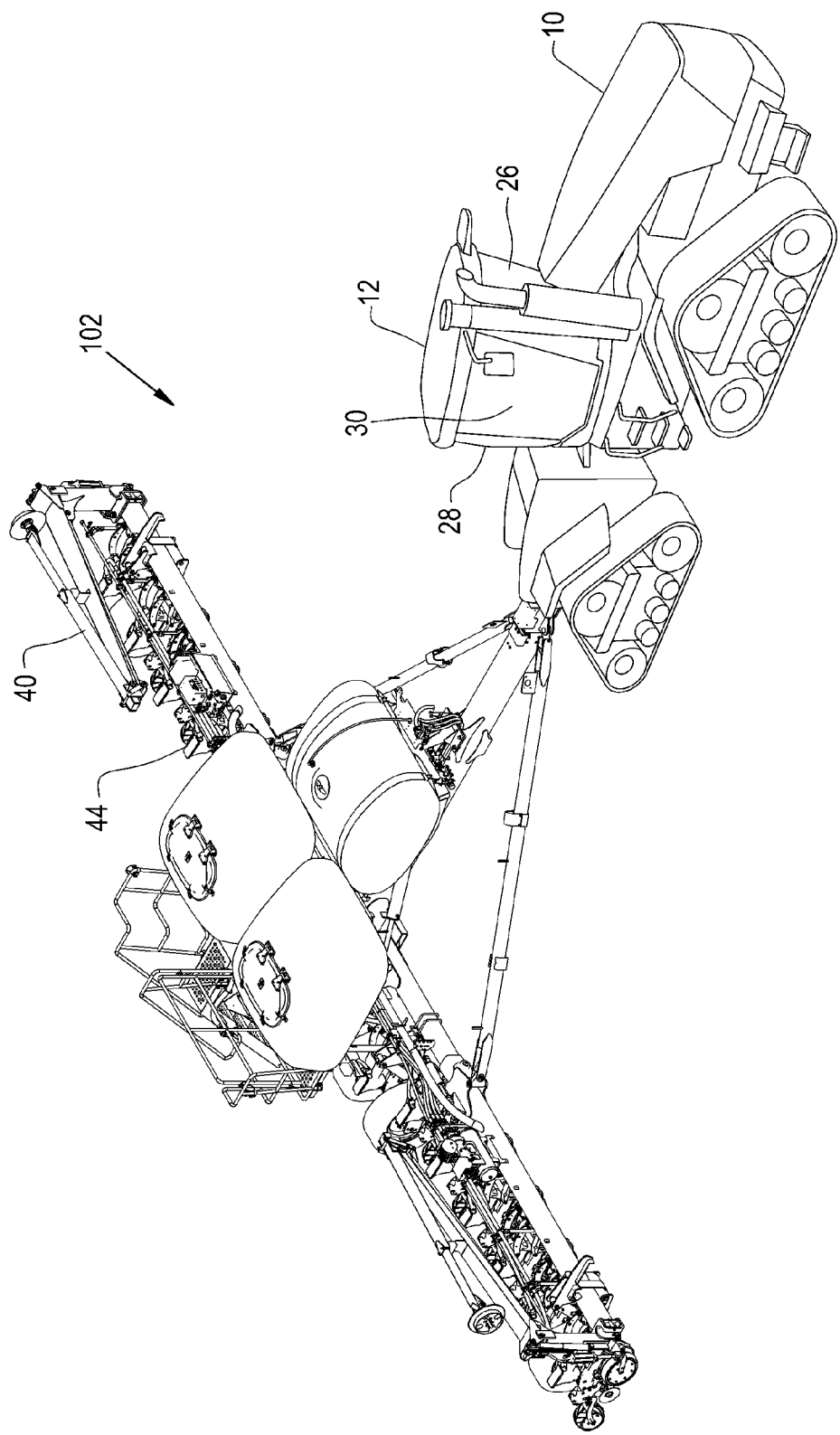
FIG. 2 is an isometric view of an agricultural vehicle towing an agricultural implement on which the work equipment system is used.

FIG. 2 shows work equipment 102 in the form of an agricultural vehicle 10 towing an agricultural implement 40. The agricultural vehicle 10, in this case a tractor, is provided with an operator cab 12 having a front windshield 26, a rear windshield 28, and side windows 30. The agricultural implement 40 possesses multiple individual row elements 44 for performing an agricultural function or applying an agricultural product. In this case, a planter is illustrated, so that the agricultural function of the agricultural implement 40 is planting seeds.

Figure 3:
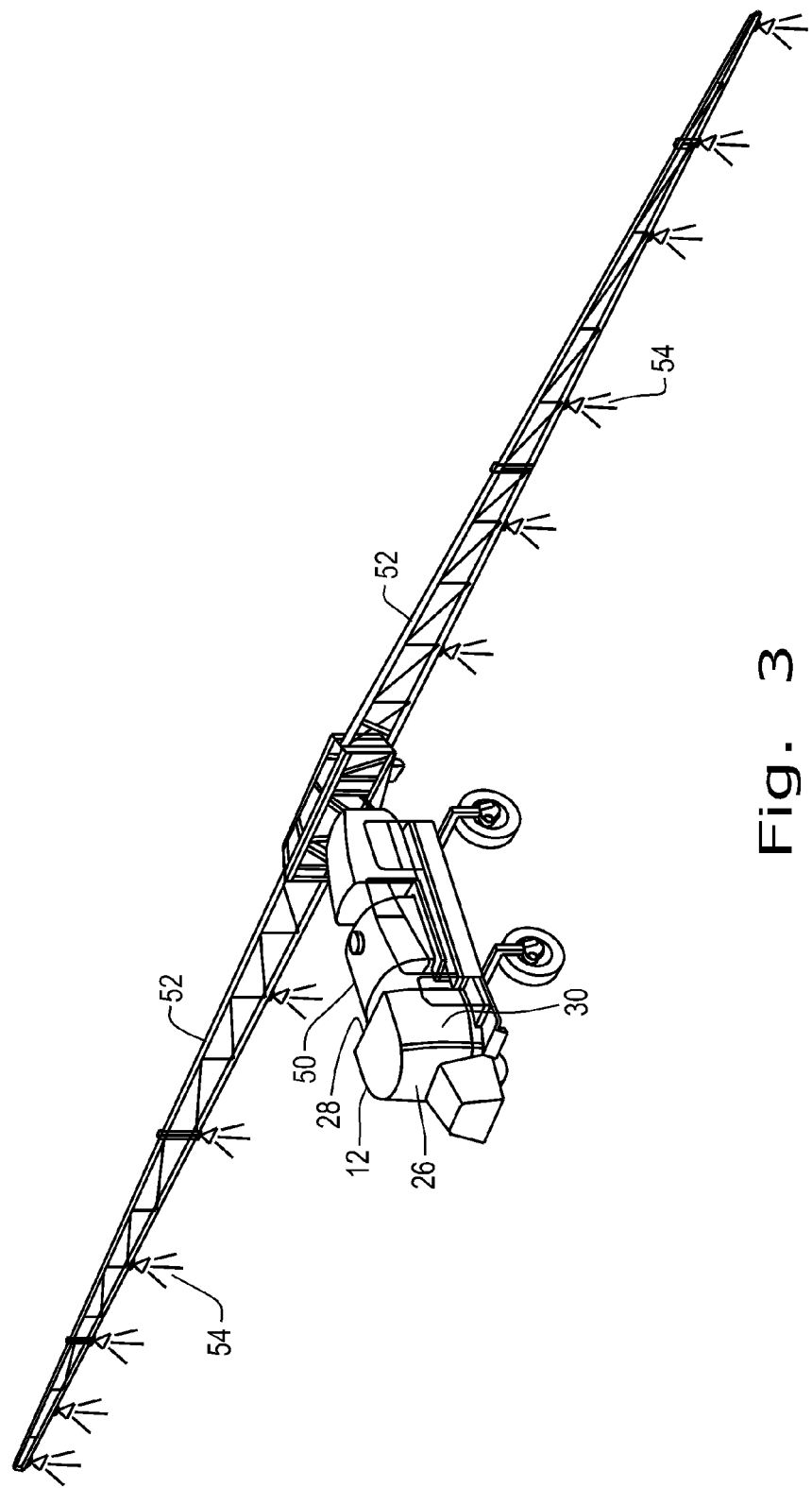
FIG. 3 is an isometric view of a self-propelled agricultural implement on which the working equipment system is used.

FIG. 3 shows another form of work equipment 102, in the way of a self-propelled agricultural implement 50 having booms 52 carrying individual row elements 54. In this case, a sprayer is illustrated, so that the agricultural function of the self-propelled agricultural implement 50 is spraying liquid agricultural products. The self-propelled agricultural implement 50 is again provided with an operator cab 12 having a front windshield 26, a rear windshield 28, and side windows 30.

Figure 4:
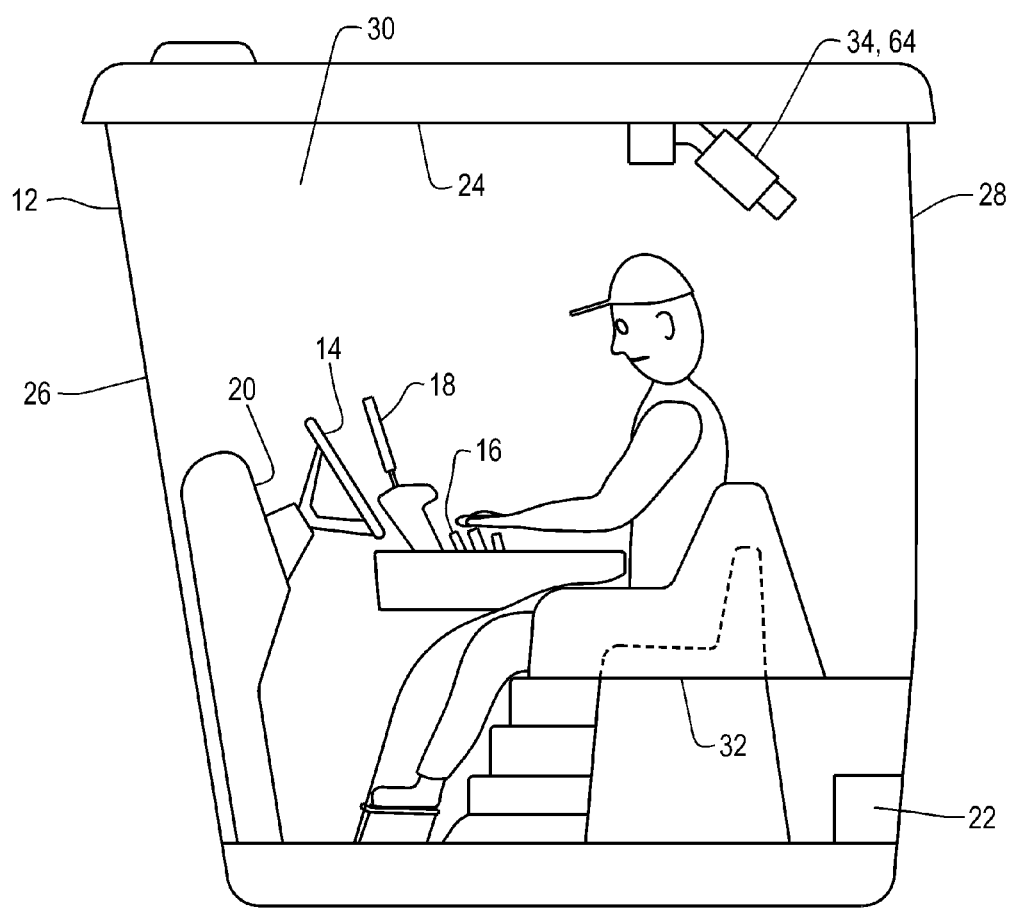
FIG. 4 is a side view of an interior of an operator cab of an agricultural vehicle or self-propelled agricultural implement showing an embodiment of the present invention.

FIG. 4 shows in more detail a side view of the inside of an operator cab 12 of either an agricultural vehicle 10 or of a self-propelled agricultural implement 50 or of another work equipment 102 possessing an embodiment of the present invention. Operator cab 12 is provided with vehicle controls 14, implement controls 16, a touch screen display 18 and an instrument cluster 20, for controlling and monitoring agricultural functions, such as the operation of an agricultural vehicle and/or an agricultural implement. As those skilled in the art will understand readily, vehicle controls 14, implement controls 16, touch screen display 18 and instrument cluster 20 are connected to and with a control module 22.

Operator cab 12 is provided also with a ceiling 24, a front windshield 26, a rear windshield 28, and side windows 30. Operator cab 12 is provided further with an operator seat 32 from which an operator can access and manipulate vehicle controls 14, implement controls 16 and touch screen display 20, while also monitoring controls 14 and 16, display 18 and instrument cluster 20. One or more camera 34 can be provided for supplying real time images to display 20 so that an operator can observe areas not seen easily from a driving position on seat 32. In the exemplary embodiment shown, camera 34 is shown directed out of rear windshield 28, but a camera or cameras may be positioned in other and/or additional locations as well. Camera 34 also is connected to the control module 22.

Figure 5:
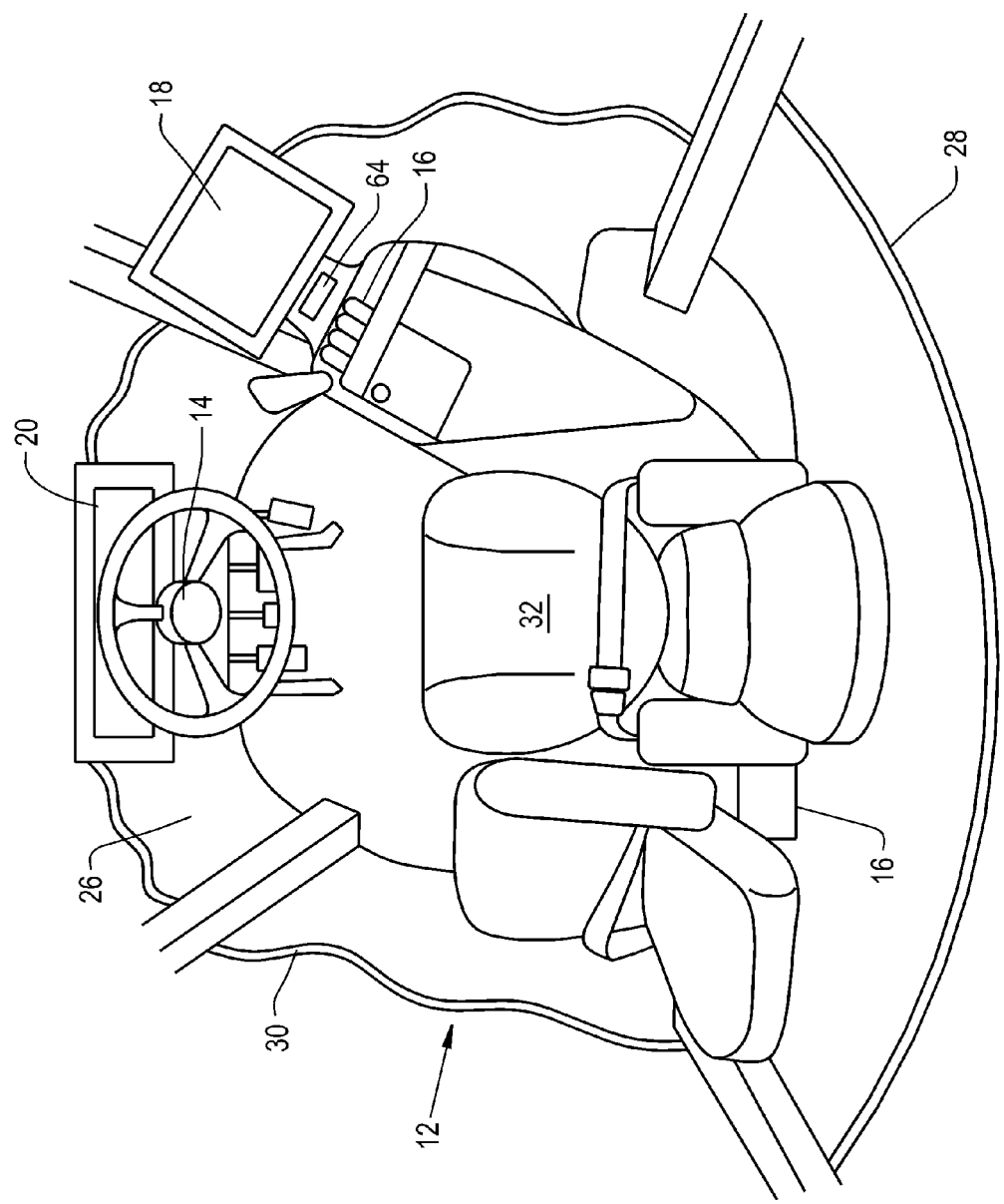
FIG. 5 is a top view of an interior of an operator cab of an agricultural vehicle or self-propelled agricultural implement showing an embodiment of the present invention.

FIG. 5 shows a top view of the inside of operator cab 12 of agricultural vehicle 10 or of a self-propelled agricultural implement 50 possessing an embodiment of the present invention. The operator cab 12 is again provided with an operator seat 32 for the operator, along with vehicle controls 14, implement controls 16, touch screen display 18 and an instrument cluster 20 for controlling and monitoring agricultural functions, such as the operation of an agricultural vehicle and/or implement.

Figure 6:
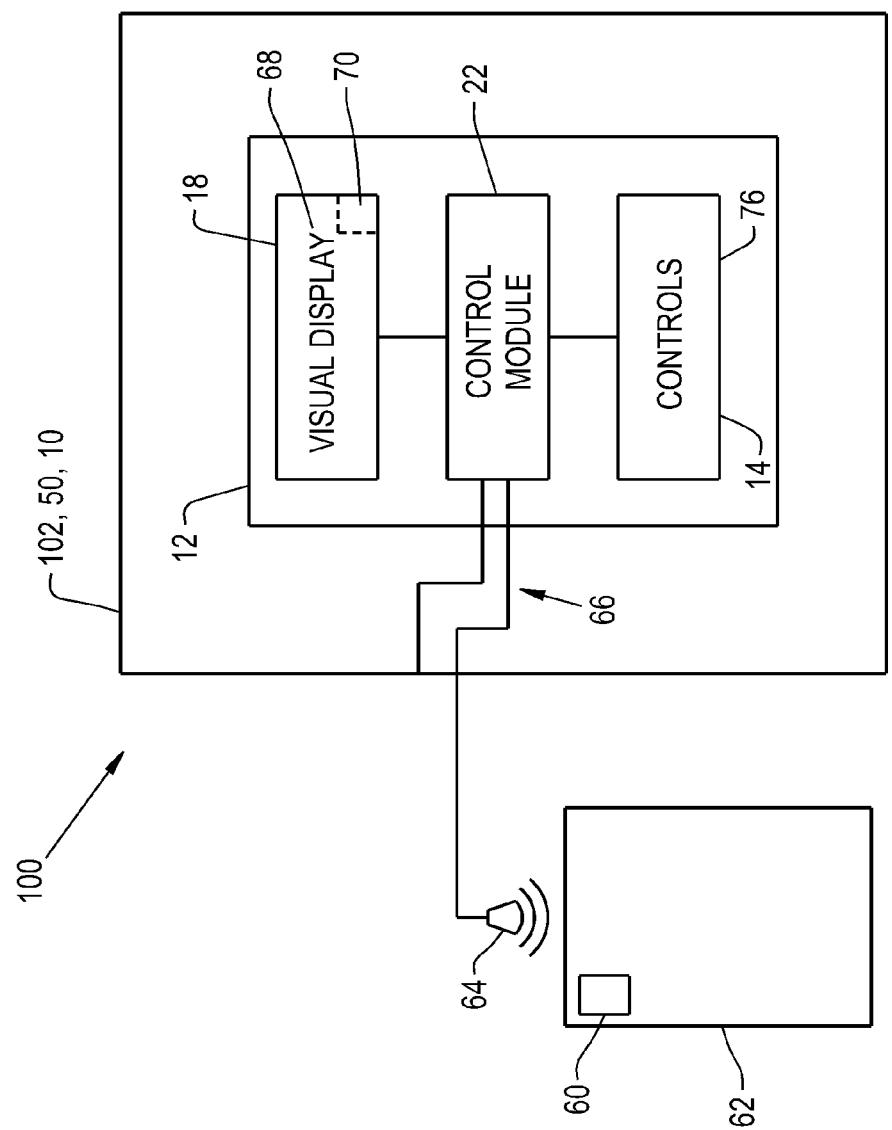
FIG. 6 is a schematic view of an embodiment of the invention.

Referring now to FIG. 6, there is shown a schematic illustration of an agricultural vehicle 10, a self-propelled agricultural implement 50 or other work equipment 100 possessing an embodiment of the present invention. According to an aspect of the present invention, an activation code 1 is provided authorizing the enablement of functions on touch screen display 18. To that end, an activation tag 60 is provided in the way of an image such as a barcode, QR code or the like on an activation tag display 62, so that activation tag 60 can be read automatically by an optical input device or reader 64. Activation tag 60 can be a fixed image attached to, or printed on an object, in which case activation tag display 62 can be a sheet of paper, or the like. Activation tag 60 also can be an electronic image displayed on a screen, in which case activation tag display 62 can be a smartphone, tablet computer, laptop computer or the like. Activation tag 60 can be any type of tag which can be read in an automated manner, including but not limited to a barcode, Quick Response (QR) code, etc. that are read by an appropriate reader 64.

Barcodes are well-known for many different purposes, and include a plurality of parallel bars of varying thickness, providing a 1 dimensional code when read by a suitable reader. QR codes are similar to bar codes, but provide a 2 dimensional code when read by a suitable reader. Bar codes and QR codes can be read from a handheld scanner, a fixed scanner, or by a camera provided with a different primary purpose, such as camera 34, for example.

Activation tag 60 includes data representing an activation code 1 needed to unlock functionalities of display 18.

Reader 64 can be a barcode reader if activation tag 60 is configured as a barcode or a QR code reader if activation tag 60 is configured as a QR code. Readers of both types can be provided to add further versatility. For some applications, reader 64 can be a handheld reader providing a wired or wireless output signal to an electrical processing circuit 66. Reader 64 also can be a fixed reader 64 in cab 12. Electrical processing circuit 66 is operatively associated with control module 22 and touch screen display 18. Touch screen display 18 provides a visual display 68 to an operator located within operator cab 12, which can include the display of information to be observed by an operator as well as a display 70, which may be a virtual control 70, such as a virtual button or the like, the manipulation of which can be used by an operator for controlling the agricultural vehicle or agricultural implement. In the exemplary embodiment shown, virtual button 70 is displayed only after processing circuit 66 receives the activation data from activation tag 60.

Processing circuit 66 and control module 22 are coupled with reader 64, either wired or wireless, and receive output signals from reader 64 representing data associated with the activation code 1 contained on activation tag 60. Control module 22 controls operation of touchscreen display 18 and the display of virtual control 68 dependent on receiving the activation data contained on activation tag 60.

Reader 64 can be of different types. For example, reader 64 can be a primary or secondary in-cab display camera utilized primarily for another purpose, such as camera 34 shown in FIG. 4, or a built-in camera of another sort associated with display 18. Reader 64 can be a barcode scanner, a QR code reader, a smart phone or tablet computer tablet connected wirelessly or wired to module 22. If reader 64 is an in-cab device as shown in FIG. 5, the activation code read thereby can be processed by either the device or by module 22 to activate functionality on display 18.

Reader 64 can be provided in or near operator cab 12 and connected wired or wirelessly to processing circuit 66. Alternatively, reader 64 can be at another location, such as an office or workplace, and the activation data scanned thereby can be entered into a personal computer or smart phone. At the home offices, devices for scanning or reading the activation tag can be as described above, an appropriate and fixed scanner, a handheld scanner, a camera, a smart phone, etc. Once the activation data is scanned into the personal computer, smart phone or the like the activation data can be entered into computer software and/or a web portal. The software or web portal can transmit the activation code to the desired vehicle 10, implement 50 or other work equipment 102 via WIFI, an internet portal, local wired or wireless connection, etc.

Work equipment system 100 is used by obtaining an activation tag 60 having a barcode or QR code thereon containing activation code 1. It should be understood that activation tag 60 may be obtained from the original provider of the software feature being activated. Activation tag 60 also may be obtained from a home office or other repository having rights to distribute activation code 1 for ultimate use. Activation of the desired feature is achieved by reading the activation tag with reader 64, transmitting a signal representative of activation code 104 to control module 22 and thereby enabling the display to present visual display 68 and/or virtual control 70 that required activation. Activation tag 60 can be provided as a printed image on paper by any suitable delivery process. Further, however, activation tag 60 can be provided as a digital image sent by text message, e-mail, wired or wireless transmission to a cell phone, tablet computer, laptop computer or the like. Activation tag 60 also can be provided as a saved image on a suitable memory device for subsequent display and use.

It should be understood that activation or unlock codes can be related to any electronic control module associated with a work equipment system, and the invention is not limited to only those functions associated or related to a display. Once received as described above, a code can be sent via any suitable connection to another control module.

Further, multiple codes can be provided simultaneously as a single scan and/or as multiple scans. Accordingly, one code can unlock one feature or functionality or multiple features or functionalities; one scan can represent multiple codes; and multiple scans or codes can be provided simultaneously.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A work equipment system in work equipment, comprising:
    work equipment for controllably performing work, said work equipment including controls, a display and a control module coupled to said controls and said display, the control module configured to cause a first portion of information accessible by the control module to be displayed on the display and to selectively cause additional portions of information accessible by the control module to be displayed on the display;
    an optical machine readable activation tag including data representing an activation code enabling functions of said display;
    an optical reader configured for reading the activation tag and providing an output signal to said control module dependent on said activation code; and
    an electrical processing circuit coupled with said optical reader and said work equipment;
    wherein the control module selectively displays a first additional selected portion of information on the display in response to the output signal.

2. The work equipment system of claim 1, wherein:
    said activation tag is a barcode.

3. The work equipment system of claim 1, wherein:
    said activation tag is a QR code.

4. The work equipment system of claim 1, wherein:
    said optical reader and said electrical processing circuit are connected wirelessly.

5. The work equipment system of claim 1, wherein:
    said activation tag is a fixed image.

6. The work equipment system of claim 5, wherein:
    said fixed image is a barcode.

7. The work equipment system of claim 5, wherein:
    said fixed image is a QR code.

8. The work equipment of claim 1, wherein:
    said activation tag is an electronic image.

9. The work equipment of claim 8, wherein:
    said electronic image is a barcode.

10. The work equipment of claim 8, wherein:
    said electronic image is a QR code.

11. A work equipment system, comprising:
    work equipment including a display configured to present a plurality of virtual controls;

a control module coupled to said display and configured to enable presentation of a first portion of the plurality of virtual controls and to enable at least one of a second portion of the plurality of virtual controls in response to receipt of a signal representative of an activation code;

an activation tag display having an activation tag thereon, said activation tag exhibiting said activation code in a machine readable form; and an activation tag reader coupled to said control module and configured for reading said activation tag and sending the signal representative of said activation code to the control module.

12. The work equipment system of claim 11, wherein: said activation tag is a barcode.

13. The work equipment system of claim 12, wherein: said bar code is an electronic image.

14. The work equipment system of claim 12, wherein: said bar code is a fixed image.

15. The work equipment system of claim 11, wherein: said activation tag is a QR code.

16. The work equipment system of claim 15, wherein: said QR code is an electronic image.

17. The work equipment system of claim 15, wherein: said QR code is a fixed image.

18. The work equipment system of claim 11, wherein said activation tag reader is coupled wirelessly to said control module.

19. The work equipment system of claim 11, wherein: said activation tag reader is located remotely from said work equipment.

20. A method for activating a control module in work equipment to selectively enable a display to present a virtual controls for operating the work equipment, said method, comprising steps of:

displaying a first portion of virtual controls on the display;

obtaining an activation tag containing the activation code as one of a barcode and a QR code;

providing an activation tag reader of a type for reading the activation tag and transmitting a signal representative of the activation code to the control module;

reading the activation tag, transmitting the signal and enabling the display to a present a second portion of the virtual controls; and operating the work equipment by utilizing at least one of the displayed virtual controls.

\* \* \* \* \*